United States Patent [19]

Magnér

[11] 4,371,281
[45] Feb. 1, 1983

[54] ROD CLAMP

[75] Inventor: Bengt Magnér, Mellösa, Sweden

[73] Assignee: Opto-System AB, Mellosa, Sweden

[21] Appl. No.: 247,597

[22] Filed: Mar. 25, 1981

[30] Foreign Application Priority Data

Mar. 31, 1980 [SE] Sweden ............................. 8002442

[51] Int. Cl.³ ........................ F16D 1/00; F16D 3/00
[52] U.S. Cl. ................................. 403/219; 403/374;
403/388; 403/408
[58] Field of Search ............... 403/217, 218, 219, 374,
403/388, 408, 385, 386

[56] References Cited

U.S. PATENT DOCUMENTS 3,512,813 5/1970 Brimberg ........................... 403/218
3,682,504 8/1972 Brimberg ....................... 403/219 X

FOREIGN PATENT DOCUMENTS 869219 4/1971 Canada ............................ 403/218
2801176 9/1978 Fed. Rep. of Germany ...... 403/218
2399193 3/1979 France ........................... 403/218

Primary Examiner—Wayne L. Shedd
Attorney, Agent, or Firm—Browdy and Neimark

[57] ABSTRACT

This invention relates to clamps of the kind for releasably connecting a plurality of rods or other elongate members at predetermined angles to each other.

According to this invention a clamp of the above kind comprises two half portions and securing means for mutually securing said half portions, each half portion comprising an inner face with a central region on which central region an annular collar 18 is disposed and through which collar a hole 17 for said means is provided and a plurality of lobes 14, 15, 16 extending from said central region said lobes being provided with lands 8 which cooperate in use of the clamp with respective elongate members.

11 Claims, 10 Drawing Figures

ROD CLAMP

FIELD OF THE INVENTION

This invention relates to a clamp for use in releasably connecting a plurality of rods or other elongate members at predetermined angles to one another. Such clamps find use in scaffoldings, storage racks, signposts, loading pallets, counters, tables, work benches and the like, where releasable connections between elongate members must be provided, release being effected without recourse to complicated tools. Connection and disconnection should be possible without causing alteration or damage to the elongate members.

BACKGROUND OF THE INVENTION

In the following specification the expression "rods" is intended to also include tubes for example of circular cross-section, since these are cheaper in respect of their strength and weight. It is possible to use rods of other cross-sections, the connecting elements being adapted to the section used.

Clamps suitable for the aforementioned uses have been disclosed e.g. in U.K. patent specification No. 1,221,230.

SUMMARY OF THE INVENTION

According to a first aspect of the invention a clamp for releasably connecting a plurality of elongate members comprises two half portions and securing means for mutually securing said half portions, each half portion comprising an inner face with a central region on which central region an an annular collar is disposed and through which collar a hole for said means is provided, and a plurality of lobes extending from said central region, said lobes being provided with lands which cooperate in use of the clamp with respective elongate members.

The present invention arose from the discovery that the liability of fracture in use of a clamp in accordance with the prior art could be reduced by removal of material from the inner faces with a consequent reduction in the cost of materials employed.

Preferably said lands define grooves which cooperate in use with respective elongate members. The central region of each half portion may be of a smaller dimension than a corresponding half portion in accordance with the prior art i.e., it may be notionally cut away. The central region may not therefore lie in a plane perpendicular to the axis of symmetry of the half portion, each half portion being required to possess axial symmetry for simplicity of use. The collar extends approximately to a height of 1 mm to 5 mm and preferably 2 mm to 3 mm from the adjacent region.

According to a second aspect of the present invention a clamp for releasably connecting a plurality of elongate members comprise two half portions and securing means for mutually securing said half portions each half portion comprising an inner face with a central region on which central region a hole for said means is provided, and a plurality of lobes extending from said central region said lobes being provided with lands which cooperate in use of the clamps with respective elongate members, said inner faces being provided with recesses in said lobes extending between said lands and said central region.

The recessed portion of each lobe is limited by walls of substantially uniform thickness, i.e. walls having essentially parallel inner and outer faces.

Preferably the clamp incorporates two identical half members.

The number of lobes on each half member is equal to the number of elongate members the clamp is intended for.

The lobes are arranged in a preferred embodiment of the invention so that the elongate members are urged into mutual contact when the clamp is tightened in use. The elongate securing means used to tighten the clamp may be a threaded rod provided with nuts, a nut and bolt, a bolt cooperating with a threaded portion of said hole, a spring or any other convenient means.

The lands are preferably arranged so that the regions of contact with each respective elongate member are disposed at a maximum convenient spaced relation. Secure fixture of the clamp to the elongate members is thereby achieved.

BRIEF DESCRIPTION OF THE DRAWINGS

The invention may be better understood from the following description by way of examples with reference to FIGS. 1 to 10 of the accompanying drawings.

Corresponding parts are in all drawings provided with corresponding reference numerals.

DESCRIPTION OF PREFERRED EMBODIMENTS

Figure 1:
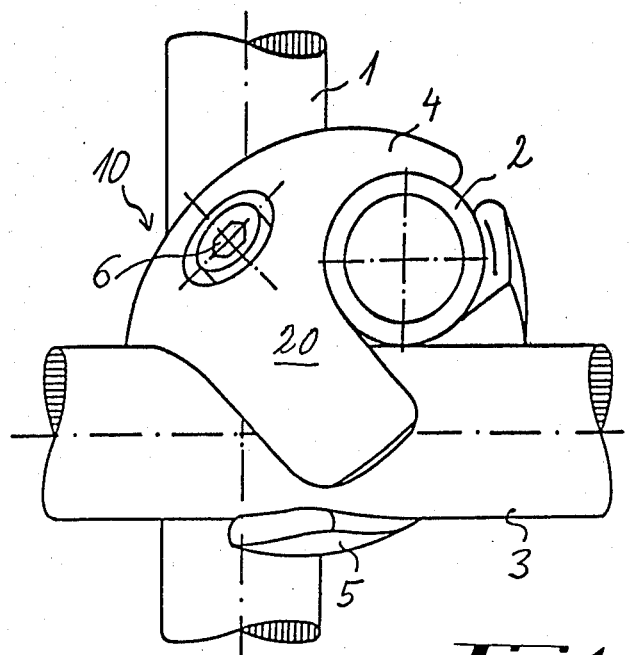
FIG. 1 is a front view of a clamp for three tubes in accordance with the present invention.
Figure 2:
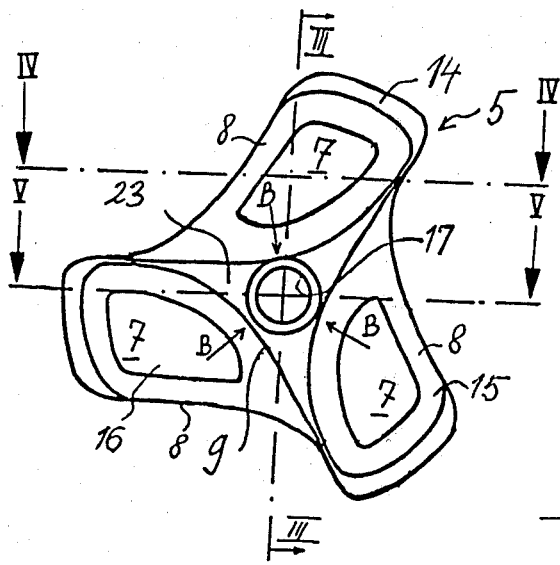
FIG. 2 shows one half portion of the clamp according to FIG. 1 in a plan view from the inside.
Figure 10:
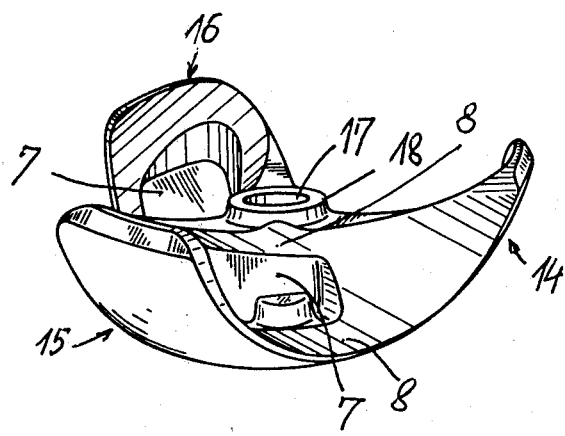
FIG. 10 shows a perspective view of a half portion of a clamp for three members.

According to FIGS. 1 and 10 a clamp 10 for three tubes 1, 2 and 3 comprises two identical half portions 4, 5 which are held together by a threaded bolt 6 and a nut (not shown). According to FIGS. 2 and 10, a half portion, e.g. the half portion 5, is provided with lobes 14, 15, 16 protruding from a central region in which a hole 17 for the threaded bolt 6 is provided. The inner face of the lobes which is shown in FIG. 2 is provided with a recess 7 which at the periphery is limited by lands 8.

Figure 3:
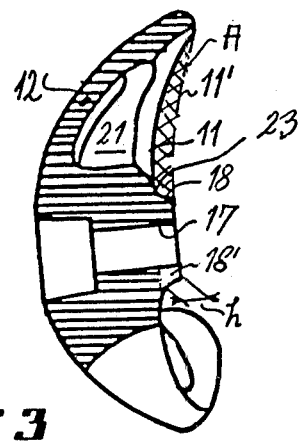
FIGS. 3 to 5 are sections through the half portion according to FIG. 2 along planes III—III, IV—IV and V—V; and in FIGS. 6 to 9 are shown in plan view and in side view two embodiments of a half portion of a clamp for two elongate members.
Figure 4:
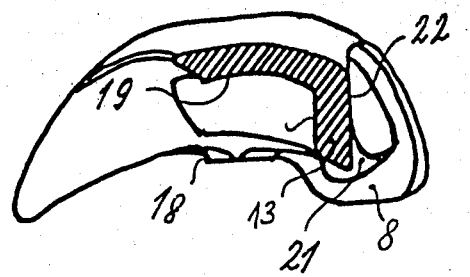
Figure 6:
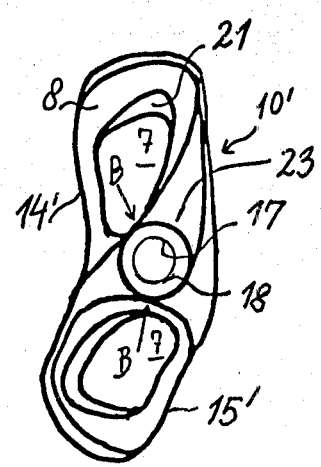
Figure 5:
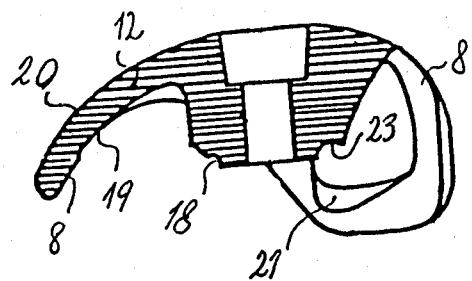
Figure 7:
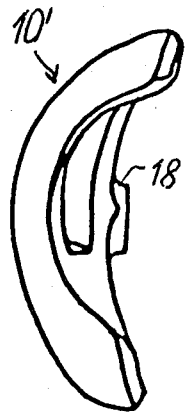

It has been found that fracture most often takes place at the locations marked by the arrows B where the central region has a minimal peripheral breadth. Measurements made at these places have shown that the strain at the edge of the hole 17 is greater (approximately 1.33 times greater) than the average strain at the side of hole. It has been concluded that the hole 17 causes a concentration of tension at the said narrow places. When the profile of the lobes is altered from that of the prior art by removal of material between the dashed contour line 11' (FIGS. 3 and 9) and the line 11 which defines the shape of a lobe in accordance with the invention, strain measurements have shown that the risk of fracture is appreciably reduced. This alteration of the outline causes a protruding collar 18 to be formed on the inner side of each half portion. This collar brings about a more even distribution of the tension and thereby a reduced risk of fracture, despite the removal of material. The collars 18 of the two half portions do not bear against each other when the clamp is assembled and tightened, and there always remains a certain free length of the bolt between the said half portions.

According to a further aspect of the present invention the recesses 7 are shaped in such a manner that the inner faces 19 of the lobes in the recesses are essentially parallel with the outer faces 20 of the lobes. The bodies or walls 12 of the lobes 14 to 16 therefore have a substantially uniform thickness. At the periphery of each lobe, the body 12 merges into a land 8 while the opposite side thereof is defined by a side wall 13 which at its inner face 21 joins essentially at right angles the inner face 19 of the body 12. The periphery of the body terminates in a land 8. The inner face 22 defines part of an adjacent groove in which another rod may be clamped. This shaping further promotes a uniform distribution of tension in the half portion and also saves material.

Figure 8:
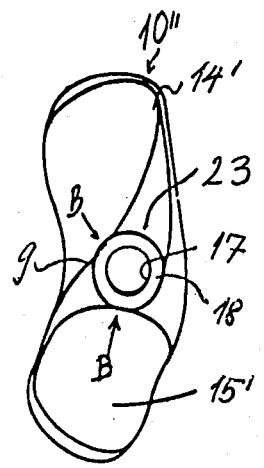
Figure 9:
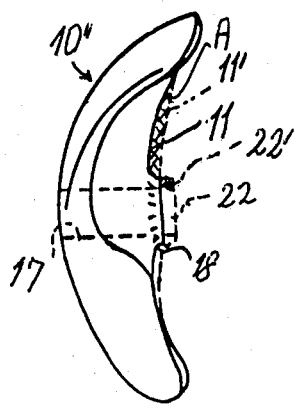

In FIGS. 6 to 9 the application of the invention is a clamp with two lobes 14', 15' (i.e. a clamp for two tubes) is shown. The same reference numerals as in the preceding figures are used for identical or analogous parts. The difference between the first embodiment 10' shown in FIGS. 6 and 7, and the second embodiment 10" shown in FIGS. 8 and 9 is that the first embodiment 10' is provided with the same profiled recesses 7 as the embodiment for three tubes according to FIGS. 2 to 5, meanwhile the second embodiment 10" does not have any recesses at all, and thus has less pronounced lands on its lobes 14', 15'.

The structure according to the present invention leads to increased strength and at the same time to a saving of material of approximately 20%.

In a clamp for three tubes with a diameter of 25 mm, made in accordance with FIGS. 1 to 5 of magnesium, it was possible to apply with a threaded bolt 6 of the size M8, a tightening moment in the order of magnitude of 50 Nm, without risk of fracture. A protruding collar 18 had a cross-sectional area 18' (FIG. 3) of approximately 2 to 3 mm×2 to 3 mm. Generally the collar 18 protrudes (height h in FIG. 3) 2 to 5 mm over the adjacent inner faces of the lobes.

It has been found further that a reduction of the risk of fracture, i.e. a more even distribution of the inner tensions, is achieved also when a protruding collar 22 (FIG. 9) with a cross-sectional area 22' is provided around the hole 17 above the conventional inner contour lines of a half portion, if for one reason or another there is no interest in saving material and reducing weight.

I claim:

1. A clamp for releasably connecting a plurality of elongate members comprising two half portions and securing means for mutually securing said half portions, each half portion comprising an inner face with a central region on which central region an annular collar is disposed and through which collar a hole for said means is provided, and a plurality of lobes extending from said central region said lobes being provided with lands which cooperate in use of the clamp with respective elongate members.

2. A clamp as claimed in claim 1, wherein in use of the clamps said lands define grooves which cooperate in use of the clamp with respective elongate members.

3. A clamp as claimed in claims 1 or 2, wherein each central region does not lie in a plane perpendicular to an axis of symmetry of the respective half portion.

4. A clamp as claimed in claims 1 or 2, wherein said collar extends to a height of between one to five millimetres from the adjacent region.

5. A clamp as claimed in claim 4, wherein said collar extends to a height of between two and three millimetres from adjacent region.

6. A clamp for releasably connecting a plurality of elongate members comprising two half portions and securing means for mutually securing said half portions, each half portion comprising an inner face with a central region on which central region a hole for said means is provided, and a plurality of lobes extending from said central region, wherein said lobes are provided with lands which cooperate in use of the clamps with respective elongate members, and have inner faces provided with recesses extending between said lands and said central region and limited by walls having substantially uniform thickness and essentially parallel outer and inner faces.

7. A clamp as claimed in claim 6, wherein said lands comprise continuous surfaces each surrounding a said recess.

8. A clamp as claimed in claim 1 or 6, wherein said lands are disposed at the periphery of each lobe.

9. A clamp as claimed in claim 1 or 6 comprising two identical half portions.

10. A clamp as claimed in claim 1 or 6, wherein the number of lobes of each half portion is equal to the maximum number of elongate members which may be clamped.

11. A clamp as claimed in claim 6, incorporating an integral collar.

* * * * *